United States Patent Office 3,006,947
Patented Oct. 31, 1961

3,006,947
PRODUCTION OF HETEROCYCLIC PHOSPHORUS-CONTAINING COMPOUNDS
William M. Lanham, Charleston, W. Va., assignor to Union Carbide Corporation, a corporation of New York
No Drawing. Filed Dec. 12, 1957, Ser. No. 702,276
15 Claims. (Cl. 260—461)

This invention relates to the production in novel manner of a class of neutral esters of phosphorus having structures designated by the formula

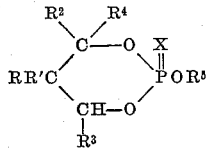

wherein R, R', $R^2$, $R^3$ and $R^4$, respectively, designates a member of the class consisting of hydrogen, and the alkyl, phenyl, benzyl, chlorine and bromine radicals, and R and $R^2$ together represent a divalent aliphatic radical of the class consisting of the tetramethylene, $-(CH_2)_4-$, radical and the lower alkyl-substituted tetramethylene radicals; X designates oxygen or sulfur; and $R^5$ designates a radical of the class consisting of the aliphatic hydrocarbyl and the monocyclic aryl hydrocarbyl radicals. The aliphatic hydrocarbyl radicals can have as substituents one or more halogens, alkoxy groups, nitro groups and the like, such as chlorine, bromine and fluorine, methoxy, ethoxy, butoxy, hexyloxy and nitro groups as substituents; and the aryl monocyclic hydrocarbyl radicals may contain one or more substituent radicals, such as the methyl, ethyl, butyl, pentyl, ethylhexyl, nonyl and other alkyl radicals; halogens such as chlorine, bromine, iodine and fluorine; nitro groups; and alkoxy groups such as methoxy, ethoxy, butoxy and 2-ethylhexyloxy groups; in one or more positions on the ring.

The novel compounds of the invention have important utility as plasticizers for synthetic resins, and particularly for vinyl chloride-containing polymers, such as the polyvinyl chlorides; and copolymers of vinyl chloride with vinyl acetate and those with acrylonitrile. The compounds also are effective insecticides, those wherein R and $R^2$ together represent a divalent aliphatic radical and having a phenyl or a substituted phenyl radical directly connected to the phosphorus atom through an oxygen atom being particularly effective, especially in the control of bean aphids, and as the effective toxic ingredient in housefly baits.

In determining the effectiveness of the compounds of the invention as plasticizers for vinyl chloride-containing synthetic resins a mixture of the resin, the phosphorus compound and a commercial heat-stabilizer for the resin is fluxed for 5 minutes on a differential two-roll mill at 158° C. in the weight proportions of 64.5%, 35% and 0.5%, respectively.

Those esters of the invention having an alkenoxy group directly attached to phosphorus can be converted to resinous polymers by ethylenic polymerization thereof. The esters of the invention also are useful dyeing assistants for dyeing articles made from acrylonitrile-containing resins and those made from vinyl chloride-containing resins.

In accordance with the invention the aforesaid compounds are made by a process which involves reacting preferably in approximately equimolar proportions, a dihalophosphate or dihalothionophosphate ester of an organic monohydroxy compound of the class consisting of the aliphatic monohydric alcohols and monohydric phenols with a diol of the class consisting of the 1,3-alkanediols having at least 3 carbon atoms; corresponding alkanediols substituted by chlorine, bromine or phenyl on one or more carbon atoms; 2-(1-hydroxyalkyl)cyclohexanols containing from 1 to 20 carbon atoms in the hydroxyalkyl group; and corresponding 2-(1-hydroxyalkyl)cyclohexanols substituted on at least one of the ring carbon atoms by at least one radical of the class consisting of bromine, chlorine, and the lower alkyl and phenyl radicals. The reaction conveniently is effected by adding the dihalophosphate ester dropwise to a solution of the diol in a volatile solvent inert to the reactants and held at temperatures of from 25° C. to 125° C., under subatmospheric pressure. An inert hydrogen chloride sequestering agent, such as pyridine or other tertiary amine, can be used to segregate the hydrogen chloride by-product in well known manner, preferably when using reaction temperatures within the range from 0° C. to 75° C., and commonly at atmospheric pressure.

Representative volatile solvents useful in the process are ethers, such as ethyl ether and isopropyl ether; organic chlorides, such as benzyl chloride and 2-ethylhexyl chloride; and aromatic hydrocarbons such as benzene and toluene.

Conveniently, when a hydrogen chloride sequestering agent such as pyridine is used in the process in stoichiometric proportions, the reaction mixture is filtered, and the filtrate is washed with water, dried, and then distilled under high vacuum. Those products derived from 2-(1-hydroxyalkyl)cyclohexanols are secured as residue products.

When the reaction is conducted under vacuum at elevated temperatures around 55° C. to 100° C. the resultant reaction mixture is refluxed under vacuum to remove acidic by-products, after which any residual acidic by-products are neutralized with a methanol or water solution of a caustic alkali such as sodium hydroxide. The residual mixture is washed with water; and the residue is stripped of volatile compounds, preferably under high vacuum.

Representative dihalophosphate esters useful in the process include the alkyl dichlorophosphates and dibromophosphates, dichlorothionophosphates and dibromothionophosphates, such as the methyl, ethyl, butyl, 2-ethylbutyl, hexyl, octyl, 2-ethylhexyl, decyl, tetradecyl and octadecyl esters; the corresponding cyanoalkyl, chloroalkyl and bromoalkyl esters such as the 2-cyanoethyl, 2-cyanoisopropyl, 4-cyano-1-butyl, 6-cyano-1-hexyl, 2-chloroethyl, 2-bromoethyl, 2-chloroisopropyl, 4-chloro-1-butyl, and 4-bromo-1-butyl esters; the corresponding alkoxyalkyl and haloalkoxyalkyl esters, such as the methoxyethyl, ethoxyethyl, hexyloxyethyl, 2-methoxyisopropyl, 2-ethoxyisopropyl, 2-hexyloxyisopropyl, 2-(2-chloroethoxy)ethyl, 2-(2-bromoethoxy)ethyl, 2-(2-chloroisopropoxy) ethyl, 2-(2-ethylhexyloxy)ethyl and 2-octyloxyisopropyl esters; the corresponding alkenyl esters, such as the allyl and crotyl esters; the corresponding aralkyl esters, such as the benzyl and 2-phenylethyl esters; aryloxyalkyl esters, such as 2-phenoxyethyl, 2-(p-tolyloxy)-ethyl and 2-(2,4-dichlorophenoxy)ethyl and 2-(2,4-dibromophenoxy)isopropyl esters; and monocyclic aryl esters such as the phenyl, p-nitrophenyl, o,p-dichlorophenyl, o-bromophenyl, p-tert-butylphenyl, p-nonylphenyl, p-dodecylphenyl, tolyl and xylyl esters.

Representative 1,3-alkanediols useful in the process include 1,3-propanediol; 1,3-butanediol; 1,3-pentanediol; 1,3-hexanediol; 2-ethyl-1,3-hexanediol; 2-butyl-2-ethyl-1,3-propanediol; 2,4-pentanediol; 3-methyl-2,4-pentanediol; 2-methyl-2-propyl-1,3-propanediol; 3-methyl-2,4-hexanediol; 2,4-heptanediol; 3-ethyl-2,4-pentanediol; 3,3-dimethyl-2,4-pentanediol; 3-isopropyl-6-methyl-2,4-heptanediol; 2,4-nonanediol; 5,5-dimethyl-2,4-hexanediol; 3,3,5-trimethyl-2,4-hexanediol; 3,3,5,5-tetramethyl-2,4- hexanediol; 2,4-decanediol; 7-ethyl-2,4-undecanediol; 7-ethyl-3-isopropyl-2,4-undecanediol; 7-ethyl - 3 - (2 - ethylhexyl)-2,4-nonanediol; 7-ethyl-3-(2-ethylbutyl)-2,4-undecanediol; 4-methyl-3,5-heptanediol; 4,4-dimethyl-3,5-heptanediol; 2,4-dimethyl-3,5-heptanediol; dotriacontane-13, 15-diol; 1-phenyl-1,3-propanediol; 1-phenyl-1,3-hexanediol; 1-phenyl-1,3-decanediol; 2-ethyl-1-phenyl-1,3-butanediol; 2-n-heptyl-1-phenyl-1,3-butanediol; 2-benzyl-1-phenyl-1,3-butanediol; 1,3 - diphenyl-2-ethyl-1,3-propanediol; 2-chloro-1,3-propanediol; 2,2-dichloro-1-phenyl-1,3-propanediol; 2-bromo-1,3-propanediol; 2-phenyl-1,3-propanediol; 2-methyl-2-phenyl-1,3-propanediol; 2-butyl-2-phenyl-1,3-butanediol; 2-methyl-2-phenyl-1,3-hexanediol; 1-(2,4,6-trimethylphenyl)-1,3-butanediol; 2-ethyl-1-phenyl-1,3-hexanediol; 2-butyl-1-phenyl-1,3-octanediol; 2-heptyl-1-phenyl-1,3-hexanediol; 2-benzyl-1-phenyl - 1,3 - hexanediol; and 2,2-dibromo-1-phenyl-1,3-propanediol.

Representative 2-(1-hydroxyalkyl)cyclohexanols useful in the process include:

2-hydroxymethylcyclohexanol
2-(1-hydroxypropyl)cyclohexanol
2-(1-hydroxyisobutyl)cyclohexanol
2-(1-hydroxyoctadecyl)cyclohexanol
2-(1-hydroxyethyl)-3,5,5-trimethylcyclohexanol
2-(1-hydroxyethyl)-3,3,5-trimethylcyclohexanol
2-(1-hydroxyisobutyl)-3,5,5-trimethylcyclohexanol
2-(1-hydroxyoctadecyl)-3,5,5-trimethylcyclohexanol
2-(1-hydroxyethyl)-6-methylcyclohexanol
2-(1-hydroxypropyl)-5-methylcyclohexanol
2-(1-hydroxyisobutyl)-4-methylcyclohexanol
3,6-dimethyl-2-(1-hydroxyoctadecyl)cyclohexanol
2,5-dimethyl-2-(1-hydroxyoctadecyl)cyclohexanol
2-(1-hydroxyethyl)-4-tert-butylcyclohexanol The following equation illustrates the nature of the reaction involved when using a 1,3-alkane diol in the process:

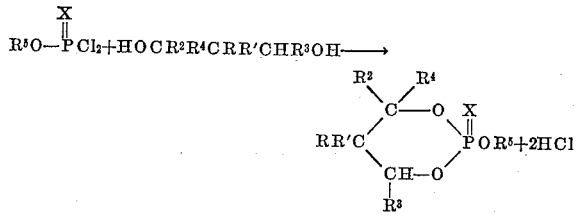

where the various R's have the meanings indicated supra, and X is oxygen or sulfur.

The following equation illustrates the general nature of the reaction involved when using as reactant a 2-(1-hydroxyalkyl)cyclohexanol and a dichlorophosphate ester:

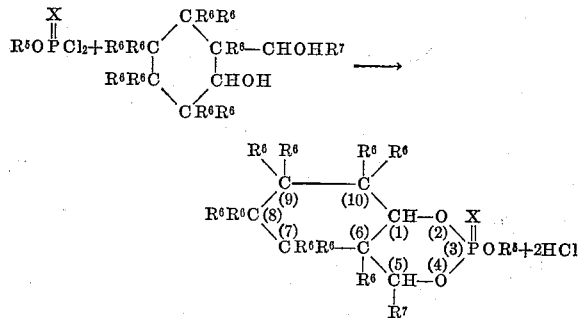

wherein each $R^6$ designates hydrogen or the same or a different lower alkyl group, $R^7$ represents hydrogen or an alkyl group having from 1 to 20 carbon atoms; and X and $R^5$ have the meanings previously indicated.

The desired product can be secured as a distillate by fractional distillation or as a distillation residue in high purity.

The following examples serve to illustrate the invention:

Example 1

To a solution consisting of 140 grams (0.96 mol) of 2-ethyl-1,3-hexanediol and 250 grams of benzyl chloride was added, dropwise, 239 grams (0.97 mol) of 2-ethylhexyl dichlorophosphate, at a kettle temperature of 55° C. under a pressure of 40 mm. of mercury. The reaction mixture then was refluxed for 13 hours at from 62° C. under 6 mm. of mercury pressure to 100° C. under 26 mm. of mercury pressure. The mixture then was neutralized with a 21% methanolic solution of caustic soda, stripped in a pot still at 100° C. under less than 2 mm. of mercury, and then distilled at 150° C. under a pressure of less than 0.2 mm. of mercury in a falling film type still. An 88% yield of 5-ethyl-2-(2-ethylhexyloxy)-2-oxo-4-propyl-1,3,2-dioxaphosphorinane was secured in the form of a colorless liquid having a specific gravity at 25°/15° C.=1.011; $n_D^{30}$=1.4499.

The 2-ethylhexyl dichlorophosphate was produced by reacting equimolar proportions of phosphoryl chloride and 2-ethylhexanol in well-known manner.

Example 2

To an agitated solution consisting of 37 grams (0.25 mol) of 2-ethyl-1,3-hexanediol, 40 grams (0.51 mol) of pyridine and 50 cc. of benzene maintained at 70° C. there was added dropwise during 10 minutes a solution of 45 grams (0.25 mol) of O-ethyl dichlorothionophosphate in 50 ccc. of benzene. After heating at 70° C. for 45 minutes and standing overnight at 25° C. the reaction mixture was cooled to 10° C. and filtered. The filtrate was stripped by distillation to a kettle temperature of 50° C. under a pressure of less than 2 mm. mercury. The still residue was dissolved in a 50–50% by volume benzene ethyl ether solution, washed with concentrated aqueous sodium bicarbonate and then with water until neutral toward litmus, and dried. After stripping the product by distillation at 100° C. under less than 1.2 mm. of mercury there was obtained 2-ethoxy-5-ethyl-4-propyl-2-thiono-1,3,2-dioxaphosphorinane in the form of a liquid having the following properties: $n_D^{30}$=1.4994; acidity=0.45 cc. of normal KOH/g.; and the following analysis, in percent by weight: P=12.50 (theory=12.27), S=12.60 (theory=12.69), C=45.64 (theory=47.60), H=8.00 (theory=8.38). It had the following structure

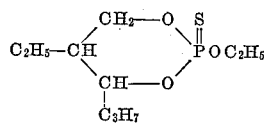

Example 3

To an agitated solution of 43 grams (0.3 mol) of 2-(1-hydroxyethyl)cyclohexanol, 50 grams (0.63 mol) of pyridine and 250 cc. of benzene maintained at 25° C. there was added dropwise during 15 minutes a solution of 74 grams (0.3 mol) of 2-ethylhexyl dichlorophosphate in 25 cc. benzene. After standing overnight at 25° C. the reaction mixture was filtered, and the filtrate subsequently was neutralized with an aqueous sodium hydroxide solution and washed with water until neutral to litmus. The washed product was distilled to a kettle temperature of 100° C. under less than 2 mm. mercury, leaving as still residue an 85% yield of 2,4-dioxa-P-(2-ethylhexyloxy)-5-methyl-P - oxo-3-phosphabicyclo(4.4.0)decane in the form of a yellowish liquid having the following properties: $n_D^{30}$=1.4671. It had the following analysis, in percent by weight: P=9.66 (theoretical=9.73), C=60.37

(theoretical=60.35), H=9.34 (theoretical=9.82). It had the following structure:

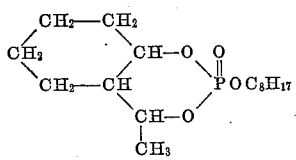

The compound is compatible with a resinous copolymer of vinyl chloride and vinyl acetate containing around 96% of the chloride in the polymer in the weight ratio of approximately 2 parts of the resin per 1 part of this plasticizer.

*Example 4*

To a solution of 182 grams (1.24 mols) of 2-ethyl-1,3-hexanediol, 216 grams (2.73 mols) of pyridine, and 500 cc. of ethyl ether held at 15°-20° C. were slowly added 331 grams (1.24 mols) of p-tert-butylphenyl dichlorophosphate. The reaction mixture was agitated at 25° C. for four hours, and then filtered. The filtrate was stripped by distillation to a kettle temperature of 70° C. under 40 mm. of mercury pressure, dissolved in 500 cc. of xylene, washed with 1,500 cc. of water, and dried, using sodium sulfate, and pot distilled at 120° C. under 5 mm. of mercury pressure. The residue was distilled at 124° C. under 10 microns of mercury pressure in a falling film type still, yielding 204 grams of 2-(p-tert-butylphenoxy)-5-ethyl-2-oxo-4-propyl-1,3,2-dioxaphosphorinane as a viscous colorless distillate having a specific gravity at 30°/15° C.=1.088; and $n_D^{30}$=1.4955.

*Example 5*

To an agitated solution of 144 grams (1.0 mol) of 2-(1-hydroxyethyl)cyclohexanol and 316 grams (4 mols) of pyridine in 420 grams of diisopropyl ether maintained at 25° C. there was added dropwise during 30 minutes 286 grams (0.98 mol) of 2-(2-ethylhexyloxy)ethyl dichlorophosphate. After standing for over 64 hours at 25° C. the reaction mixture was filtered. The filtrate was neutralized using aqueous sodium hydroxide, washed with 800 cc. of water and then stripped by distillation to a kettle temperature of 100° C. under less than 2 mm. mercury, yielding 155 grams of 2,4-dioxa-P-(2-(2-ethylhexyloxy)ethoxy)-5-methyl-P-oxo - 3 - phosphabicyclo (4.4.0) decane as a clear brown liquid residue having $n_D^{30}$=1.4655 and the following analysis, in percent by weight: P=7.7 (theory=8.55), C=60.69 (theory=59.68), H=10.36 (theory=9.73). The washings from the water treatment of the filtrate were diluted with ethyl ether, washed with water, and stripped to 100° C. under less than 2 mm. mercury pressure, yielding 55 additional grams of the aforesaid compound.

*Example 6*

To an agitated solution of 55 grams (0.25 mol) of 2,2-dichloro-1-phenyl-1,3-propanediol and 40 grams (0.50 mol) of pyridine in 200 grams of ethylene dichloride maintained at 25° C. was added dropwise during 10 minutes 41 grams (0.25 mol) of ethyl dichlorophosphate. After standing overnight the reaction mixture was filtered, and the filtrate was neutralized with aqueous sodium bicarbonate solution and then washed with water until neutral to litmus. The washed mixture then was stripped by distillation to a kettle temperature of 100° C. under less than 2 mm. mercury, yielding 5,5-dichloro-2-ethoxy-2-oxo-4-phenyl-1,3,2-dioxa-phosphorinane in the form of a yellow liquid (at 100° C.) which solidified on standing at 25° C. to a product melting at 89-110° C. and mostly around 95° C. The product analyzed 8.95% phosphorus; 23.13% chlorine; 42.20% carbon and 4.67% hydrogen.

*Example 7*

2 - (2 - chloroethoxy) - 5-ethyl-2-oxo-4-propyl-1,3,2-dioxaphosphorinane was prepared by the dropwise addition of 197 g. (1.0 mol) of 2-chloroethyl dichlorophosphate to an agitated solution of 146 g. (1.0 mol) of 2-ethyl-1,3-hexanediol in 250 g. of benzyl chloride at a reaction temperature of 55° C. under 40 mm. of mercury pressure. After the addition the reaction mixture was maintained at 55° C./40 mm. for an additional hour, refluxed at 100° C./40 mm. for a period of 6.5 hours, and stripped by pot distillation at 100° C./<2 mm. The resulting residue was neutralized using aqueous sodium bicarbonate, washed once with water, and stripped by pot distillation at 100° C./<2 mm. The 255 g. of residue from the latter distillation was filtered, and the filtrate stripped by distillation at 78° C./<0.2 mm., using a falling film type still. There was thus obtained 191 g. (94% yield) of residue prroduct which had the following properties: acidity=0.002 cc. of N base/g., specific gravity at 25°/15°/C.=1.192; $n_D^{30}$=1.4629; percent Cl=13.11 (theory=13.10).

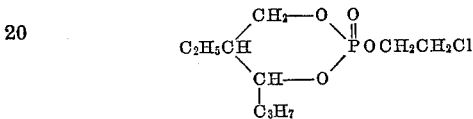

*Example 8*

5 - ethyl - 2-(2-ethylhexyloxy)-2-oxo-4-propyl-1,3,2-dioxaphosphorinane was prepared as follows:

To an agitated solution of 2-ethylhexyl dichlorophosphate, prepared by reaction of 92.0 lbs. (0.6 pound mol) of phosphoryl chloride and 78.1 lbs (0.6 pound mol) of 2-ethylhexanol, in 75 lbs. of 2-ethylhexyl chloride, was added over a period of 2.25 hours a solution of 87.7 lbs. (0.6 pound mol) of 2-ethyl-1,3-hexanediol and 75 lbs. of 2-ethylhexyl chloride, at a reaction temperature of 50°/C., under 40 mm. of mercury pressure. After the addition the reaction mixture was maintained at 52°/C./40 mm. for an additional hour, refluxed at 92°C./40 mm. for 13.5 hours, and neutralized at 25°C. by the addition of 22.5 lbs. of 20% aqueous sodium hydroxide. The neutralized product was washed at 90° C. using a countercurrent washer at a feed rate of 4 gallons of oil and 16 gallons of water per hour. The resulting 284 lbs. of oil, which was removed as a top layer, was composited with 200 lbs. of washed oil from a second run, stripped by pot distillation at 140° C./3 mm., steamed at 140° C./30 mm. for 1.5 hours, cooled to 25° C. and filtered. There was obtained 245 lbs. of light yellow, fluid filtrate which had the following properties; acidity= 0.03 cc. of N base/g.; $n_D^{30}$=1.4511; percent Cl=nil, percent purity (by saponification)=95.4, percent P=9.56 (theory=9.67), percent C=60.39 (theory=60.00), percent H=10.41 (theory=10.38) percent yield=64.

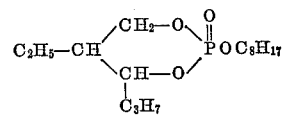

Compounds of the invention have been found to possess insecticidal activity in the control of bean aphids and other insect pests. Thus aqueous solutions containing as little as 90 milligrams per 100 ml. of 2,4-dioxa-5-methyl - P - oxo-P-(2-propoxy)-3-phosphabicyclo(4.4.0)-decane and those containing as little as 64 mg. per 100 ml. of 2,4-dioxa-5-methyl-P-oxo-P-phenoxy-3-phosphabicyclo(4.4.0)decane have effected 95–100% control of aphis rumicis in 24 hours on nasturtium plants infested therewith. The same control of aphis rumicis is secured using aqueous solutions containing smaller concentrations of such compounds of the invention as 2-ethoxy-4-methyl-2-oxo-1,3,2-dioxaphosphorinane, 2-chloropropoxy-4-methyl-2-oxo-1,3,2-dioxaphosphorinane, 4,6-dimethyl-2-oxo-2-propoxy-1,3,2-dioxaphosphorinane, 5,5-dimethyl-2-oxo-2-propoxy-1,3,2-dioxaphosphorinane, and others.

By way of further illustration of the invention, in the practice of the novel process of the invention as described herein, the reaction of 4-cyanobutyl dichlorophosphate and 1-phenyl-1,3-decanediol yields 2-(4-cyanobutoxy)-6-heptyl-2-oxo-4-phenyl-1,3,2-dioxaphosphorinane; the reaction of octadecyl dibromophosphate and 2-benzyl-1-phenyl-1,3-butanediol yields 5-benzyl-6-methyl-2-octadecyloxy-2-oxo-4-phenyl-1,3,2-dioxaphosphorinane; the reaction of decyl dichlorothionophosphate and 2-butyl-2-ethyl-1,3-propanediol yields 5-butyl-2-decyloxy-5-ethyl-2-thiono-1,3,2-dioxaphosphorinane; the reaction of allyl dibromophosphate and 7-ethyl-2,4-undecanediol yields 2-allyloxy-4-(3-ethylheptyl)-6-methyl-2-oxo-1,3,2-dioxaphosphorinane; the reaction of 2-chloroethyl dichlorophosphate and 2-(1-hydroxyoctadecyl)cyclohexanol yields P-(2-chloroethoxy)-2,4-dioxa-5-heptadecyl-P-oxo-3-phosphabicyclo(4.4.0) decane; the reaction of tetradecyl dichlorophosphate and 2-(1-hydroxyethyl)-4-tert-butylcyclohexanol yields 8-tert.butyl-2,4-dioxa-5-methyl-P-oxo-P-tetradecyloxy-3-phosphabicyclo(4.4.0)decane; and the reaction of decyl dibromothionophosphate with 2-(1-hydroxyethyl)-3,5,5-trimethylcylohexanol yields P-decyloxy-2,4-dioxa-5,7,9,9-tetramethyl-P-thiono-3-phosphabicyclo(4.4.0)decane.

The expression "esters of a monohydroxy compound of the class consisting of the aliphatic monohydric alcohols and the monohydric phenols" used in the claims is intended to embrace both the unsubstituted alkanols, alkenols and phenols and similar compounds having as substituents one or more chlorine, bromine, cyano, alkoxy or nitro radicals, including those phenols substituted by an alkyl radical having 1 to 12 carbon atoms.

This application is a continuation-in-part of my pending application Serial No. 340,399, filed March 4, 1953.

The invention is susceptible of modification within the scope of the appended claims.

I claim:

1. Process for producing heterocyclic phosphorus-containing esters, which comprises reacting in approximately equimolecular proportions (1) an ester of the class consisting of the dichlorophosphate, dibromophosphate, dichlorothionophosphate and dibromothionophosphate esters of a monohydroxy compound of the class consisting of (a) the aliphatic unsubstituted monohydric alcohols containing 1 to 18 carbon atoms, and (b) the lower alkanols substituted on one to two carbon atoms by one to two radicals of the class consisting of the chloro, bromo, cyano, alkoxy, chloroalkoxy, bromoalkoxy, phenoxy, tolyloxy, and corresponding phenoxy and tolyloxy radicals substituted on one to two carbon atoms of the ring by a member of the class consisting of the chloro and bromo radicals; (c) the lower alkenols; (d) the monohydric phenols having 6 to 8 carbon atoms; and (e) the corresponding monohydric phenols having one to two carbon atoms of the carbocyclic ring substituted by a member of the class consisting of the chloro, bromo and nitro radicals and alkyl radicals having one to 12 carbon atoms, with (2) a diol of the class consisting of the 1,3-alkanediols having from 3 to 32 carbon atoms; corresponding 1,3-alkanediols substituted on at least one of the carbon atoms by at least one member of the class consisting of chlorine, bromine, and the phenyl and benzyl radicals; the 2-(1-hydroxyalkyl)cyclohexanols having 1 to 20 carbon atoms in the hydroxyalkyl group; and corresponding 2-(1-hydroxalkyl)cyclohexanols substituted on 1 to 2 of the carbon atoms of the cyclohexanol ring by at least one lower alkyl radical, in the presence of a volatile solvent inert to the reactants, at temperatures within the range from around 0° C. to around 125° C. and eliminating the by-product hydrogen halide as formed.

2. Process as defined in claim 1 wherein the said ester reactant is fed in small successive portions into a solution of the said diol in a volatile solvent inert to the reactants, at elevated temperatures under subatmospheric pressure.

3. Process as defined in claim 1 wherein said ester reactant and said diol are reacted in the presence of a tertiary amine sequestering agent for the by-product hydrogen chloride, at temperatures within the range from around 0° C. to around 75° C.

4. Process for producing heterocyclic phosphorus-containing esters, which comprises reacting a dichlorophosphate ester of an alkanol having 1 to 18 carbon atoms with a diol of the class set forth in claim 1, in the presence of a volatile solvent inert to the reactants, at temperatures within the range from around 0° C. to around 125° C., and eliminating the by-product hydrogen chloride as formed.

5. Process for producing heterocyclic phosphorus-containing esters, which comprises reacting a dichlorophosphate ester of a lower alkanol substituted on 1 to 2 carbon atoms by 1 to 2 chlorine atoms with a diol of the class set forth in claim 1, in the presence of a volatile solvent inert to the reactants, at temperatures within the range from around 0° C. to around 125° C., and eliminating the by-product hydrogen chloride as formed.

6. Process for producing heterocyclic phosphorus-containing esters, which comprises reacting a dichlorophosphate ester of a lower alkanol substituted on 1 to 2 carbon atoms by cyano groups with a diol of the class set forth in claim 1, in the presence of a volatile solvent inert to the reactants, at temperatures within the range from around 0° C. to around 125° C., and eliminating the by-product hydrogen chloride as formed.

7. Process for producing heterocyclic phosphorus-containing esters, which comprises reacting a dichlorophosphate ester of a lower alkenol with a diol of the class set forth in claim 1, in the presence of a volatile solvent inert to the reactants, at temperatures within the range from around 0° C. to around 125° C., and eliminating the by-product hydrogen chloride as formed.

8. Process for producing heterocyclic phosphorus-containing esters, which comprises reacting a dichlorophosphate ester of a monocyclic monohydric phenol having 6 to 8 carbon atoms with a diol of the class set forth in claim 1, in the presence of a volatile solvent inert to the reactants, at temperatures within the range from around 0° C. to around 125° C., and eliminating the by-product hydrogen chloride as formed.

9. Process for producing heterocyclic phosphorus-containing esters, which comprises reacting a dichlorophosphate ester of an alkanol having 1 to 18 carbon atoms with a 2-(1-hydroxyalkyl) cyclohexanol having 1 to 20 carbon atoms in the hydroxyalkyl group, at temperatures in the range from around 0° C. to around 125° C.

10. Process for producing heterocyclic phosphorus-containing esters, which comprises reacting a dichlorophosphate ester of a lower alkanol substituted on 1 to 2 carbon atoms by 1 to 2 chlorine atoms with a 2-(1-hydroxyalkyl) cyclohexanol having 1 to 20 carbon atoms in the hydroxyalkyl group, at temperatures in the range from around 0° C. to around 125° C.

11. Process for producing heterocyclic phosphorus-containing esters, which comprises reacting a dichlorophosphate ester of a lower alkanol substituted on 1 to 2 carbon atoms by 1 to 2 alkoxy groups with a 2-(1-hydroxyalkyl) cyclohexanol having 1 to 20 carbon atoms in the hydroxyalkyl group, at temperatures in the range from around 0° C. to around 125° C.

12. Process for producing heterocyclic phosphorus-containing esters, which comprises reacting a dichlorophosphate ester of a monocyclic monohydric phenol having 6 to 18 carbon atoms with a 2-(1-hydroxyalkyl) cyclohexanol having 1 to 20 carbon atoms in the hydroxyalkyl group, at temperatures in the range from around 0° C. to around 125° C.

13. Process for producing heterocyclic phosphorus-containing esters, which comprises reacting a dichlorophosphate ester of a monocyclic monohydric phenol substituted on 1 to 2 carbon atoms of the ring with 1 to 2 alkoxy groups with a 2-(1-hydroxyalkyl) cyclohexanol having 1 to 20 carbon atoms in the hydroxyalkyl group, at temperatures in the range from around 0° C. to around 125° C.

14. Process for producing heterocyclic phosphorus-containing esters, which comprises reacting a dichlorothionophosphate ester of an alkanol having 1 to 18 carbon atoms with a diol of the class set forth in claim 1, in the presence of a volatile solvent inert to the reactants, at temperatures within the range from around 0° C. to around 125° C., and eliminating the by-product hydrogen chloride as formed.

15. Process for producing heterocyclic phosphorus-containing esters, which comprises reacting a dichlorothionophosphate ester of an alkanol having 1 to 18 carbon atoms with a 2-(1-hydroxyalkyl) cyclohexanol having 1 to 20 carbon atoms in the hydroxyalkyl group, at temperatures in the range from around 0° C. to around 125° C.

References Cited in the file of this patent

UNITED STATES PATENTS 2,661,336    Gamrath et al. _____ Dec. 1, 1953

FOREIGN PATENTS 762,125    Great Britain _____ Nov. 21, 1956